May 9, 1961    J. J. NEFF    2,983,339
DIFFERENTIAL DISC BRAKE
Filed Aug. 13, 1959    2 Sheets-Sheet 1
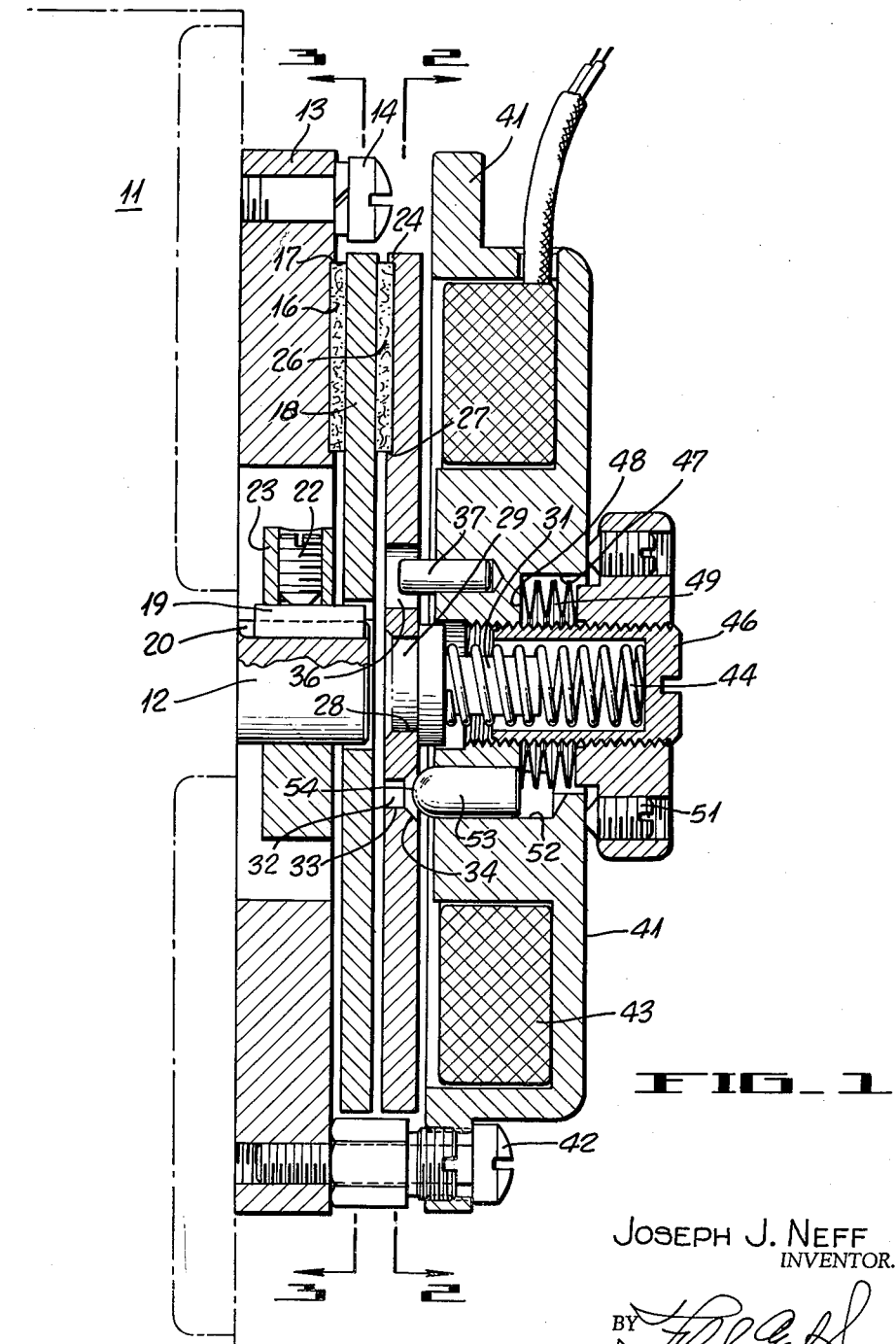
FIG_1
JOSEPH J. NEFF
INVENTOR.
BY *Flehr Juck Swain*
ATTORNEYS

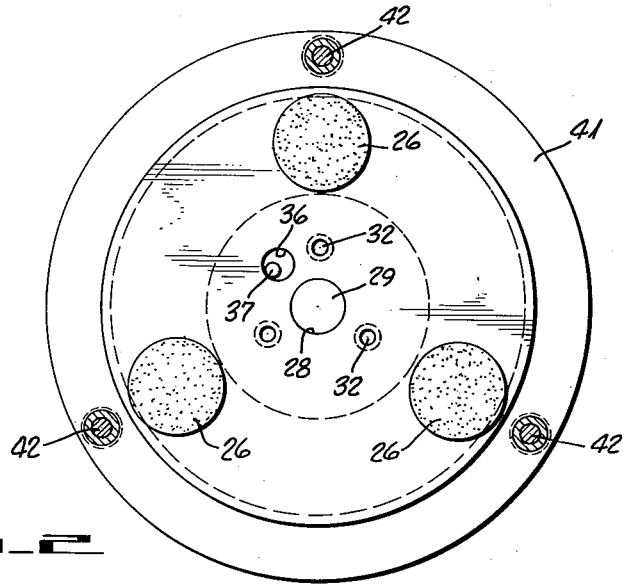
FIG_2
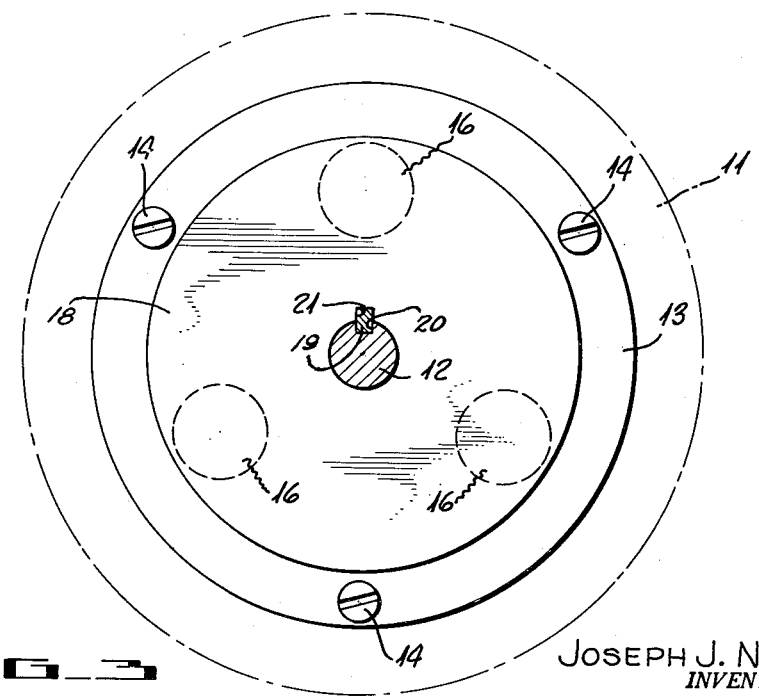
FIG_3
JOSEPH J. NEFF
INVENTOR.
BY
ATTORNEYS

United States Patent Office 2,983,339
Patented May 9, 1961

2,983,339

DIFFERENTIAL DISC BRAKE

Joseph J. Neff, Los Altos, Calif., assignor to Ampex Corporation, Redwood City, Calif., a corporation of California Filed Aug. 13, 1959, Ser. No. 833,459

7 Claims. (Cl. 188—171)

This invention relates generally to a differential disc brake and more particularly to a differential disc brake suitable for use on magnetic tape apparatus.

In magnetic tape apparatus, the brakes associated with each of the turntables are applied when it is desired to stop motion of the tape. During the braking operation it is necessary to make certain that the tape tension will not exceed at any time the safe elastic limit for the tape, nor, on the other hand, that there will be a slack loop formed. Such a loop might cause tape breakage when the machine is again started. In general, the foregoing problems are solved by assuring that the braking effort on the reel which is supplying the magnetic tape is slightly greater, by a carefully controlled amount, than that which is applied to the reel taking up the tape. This differential braking effort must be maintained within proper limits in either direction of tape travel (fast forward or rewind) for various combinations of full and empty reels. In the prior art, differential braking pressure is achieved by employing self-energizing band brakes.

It is a general object of the present invention to provide an improved differential brake.

It is a further object of the present invention to provide a differential disc brake which may be mounted directly on a motor housing with which it is associated.

It is still a further object of the present invention to provide a differential brake which applies increased braking effort when the associated motor shaft is rotating in one direction of travel.

It is still a further object of the present invention to provide a disc brake which includes a movable element mounted to the rotating shaft, and means for providing a first braking force, and means for providing an additional force to the brake shoe upon slight angular displacement of the same in a predetermined direction.

These and other objects of the invention will become more clearly apparent from the following description when taken in conjunction with the accompanying drawing.

Referring to the drawing:

Figure 1 is a sectional view showing a brake in accordance with the present invention;

Figure 2 is a view taken along the line 2—2 of Figure 1; and

Figure 3 is a view taken along the line 3—3 of Figure 1.

Referring to Figure 1, there is schematically illustrated a motor housing 11 with a protruding motor shaft 12. A stationary brake shoe 13 is suitably secured to the motor housing as, for example, by means of spaced screws 14. The exposed surface of the brake shoe is provided with suitable brake lining 16 which, for example, may be in the form of spaced pads located on the surface. If desired, the surface may be recessed as at 17 to receive and securely hold the pads.

A disc 18 is secured to the shaft as, for example, by the key 19 which engages the slot 20 formed in the shaft and the slot 21 formed in the disc. A set screw 22 threadably received by the collar 23 may be provided for holding the key in place. A movable brake shoe or disc 24 is provided on the other side of the disc 18 and includes a plurality of brake lining pads 26 which are accommodated, if desired, within the accommodating recesses 27 to prevent slippage of the pads on the movable brake shoe, as previously described.

The movable brake shoe is provided with a central opening 28 which is adapted to receive the stud portion 29 of the spring guide 31. A plurality of pin receiving holes 32 having centers which lie in a circle are formed in the shoe 24. Each of the holes has a cylindrical portion 33 with a flared portion 34. As will be presently described, the flared portion acts as a cam. The opening 36 is adapted to receive a stop pin 37 whose diameter is less than the diameter of the hole 36 whereby the shoe 24 may rotate through a small angle before the sides of the opening 36 are abutted by the pin 37. A coil housing 41 is secured to the stationary shoe 13 as, for example, by the adjustable studs 42. The coil housing accommodates an electrical coil 43 which, when energized, serves to attract the shoe 24.

The housing includes a central threaded opening which accommodates the spring guide 31 and spring 44, and threadably receives the spring bushing 46. Axial adjustment of the bushing 46 will control the pressure exerted by the spring 44 against the shoulder formed in the spring guide. The guide, in turn, engages the movable shoe 24 to urge the same axially towards the disc 18 mounted on the motor shaft. The housing includes a central bore 47 of enlarged diameter which forms a shoulder 48. A spring, for example, formed of a plurality of spring washers 49, is disposed within the bore. An adjustable nut is threadably received by the bushing 46 and serves to control the compression of springs 49. When the desired compression is achieved, the nut may be locked in place by the set screws 51 carried on the rim of the adjustable nut.

A plurality of pin receiving openings 52 are formed in the coil housing and are adapted to receive pins 53 which have a rounded end 54 adapted to coincide with the pin receiving openings 32. The other ends of the pins 53 are adapted to abut the adjacent end of the compression sprirng 49 and to compress the same when they are urged upwardly above the shoulder 48.

The location of the pin receiving openings 32 and the enlarged stop opening 36 are so selected that in one direction of rotation of the shaft, the pin 37 abuts the side walls of the opening 36 and the pins 53 are aligned with the adjacent openings 32. No additional force is brought to bear against the shoe 24. The only braking effort is the braking effort exerted by the spring 44. However, when rotation in an opposite direction takes place, the pin 37 permits the shoe 24 to rotate through a small angle which is sufficient to cause the rounded end 54 of the pins to ride upwardly along the camming surface 34. As the pins ride up along the camming surface, the opposite ends engage and further compress the springs 49. Additional axial force is applied to the movable shoe 24 thereby increasing the braking effort.

As previously described, the coil housing serves to accommodate a solenoid coil 43 which attracts the movable shoe 24. The field strength of the coil is selected so that when the coil is energized, the force of attraction of the shoe 24 will overcome the spring forces and thus axially move the shoe to release the brakes.

Thus, it is seen that applicant has provided an improved differential brake. When rotating in a predetermined direction, additional braking force is automatically applied. Thus, the braking effort can be made slightly greater for the reel which is supplying tape than for the reel which is taking up tape. The amount of braking effort is easily adjusted whereby the differential and actual braking effort can be easily adjusted.

I claim:

1. A braking apparatus for differentially braking a shaft in opposite directions of rotation comprising, in combination, a shaft rotatable in opposite directions, a disc concentric with and connected to said shaft to rotate with said shaft, a brake shoe having braking means thereon positioned to engage said disc, a base member, means connected between said base member and said brake shoe for limiting relative rotation between a first position and a second position, pressure means extending between said base member and said brake shoe for pressing said brake shoe against said disc, pressure reducing mean positioned to receive said pressure means in one of the positions whereby the pressure on said disc is reduced when in said one position.

2. A braking apparatus for differentially braking a shaft in opposite directions of rotation comprising, in combination, a shaft rotatable in opposite directions, a disc concentric with and connected to said shaft to rotate with said shaft, a brake shoe having braking means thereon positioned to engage said disc, a base member, means connected between said base member and said brake shoe for limiting relative rotation between a first position and a second position, pressure means on said base member extending toward said brake shoe for pressing said brake shoe against said disc, pressure reducing means on said brake shoe positioned to receive said pressure means in one of the positions whereby the pressure on said disc is reduced when in said one position.

3. A braking apparatus for differentially braking a shaft in opposite directions of rotation comprising, in combination, a shaft rotatable in opposite directions, a disc concentric with and connected to said shaft to rotate with said shaft, a brake shoe having braking means thereon positioned to engage said disc, a base member, means connected between said base member and said brake shoe for limiting relative rotation between a first position and a second position, first pressure means extending between said base member and said brake shoe for pressing said brake shoe against said disc, second pressure means extending between said base member and said brake shoe for applying a cumulative force pressing said brake shoe against said disc, pressure reducing means positioned to receive said first pressure means in one of the position whereby the pressure on said disc is reduced when in said one position, and pressure release means positioned to release the pressure of said brake shoe on said disc.

4. A braking apparatus for differentially braking a shaft in opposite directions of rotation comprising, in combination, a shaft rotatable in opposite directions, a disc concentric with and connected to said shaft to rotate with said shaft, a first brake shoe having braking means thereon positioned to engage said disc, a second brake shoe having braking means thereon positioned to engage the opposite side of said disc, a base member, means for supporting said first brake shoe and said base member for relative movement therebetween, means connected between said base member and said first brake shoe for limiting relative rotation between a first position and a second position, pressure means on said base member for pressing said first brake shoe against said disc, pressure reducing means on said first brake shoe positioned to receive said pressure means in one of the positions whereby the pressure on said disc is reduced when in said one position.

5. A braking apparatus for differentially braking a shaft in opposite directions of rotation comprising, in combination, a shaft rotatable in opposite directions, a disc concentric with and connected to said shaft to rotate with said shaft, an axially movable brake shoe having braking means thereon positioned to engage said disc, a base member, means connected between said base member and said brake shoe for limiting the relative rotation of said brake shoe between a first position and a second position, a first pressure means extending between said base member and said brake shoe for pressing said brake shoe against said disc, a second pressure means extending between said base member and said brake shoe for applying a cumulative force pressing said brake shoe against said disc, said second pressure means including a plurality of axially movable pins and spring means urging said pins against said brake shoe, said brake shoe having a plurality of recesses positioned to receive said pins in one of the positions whereby the pressure on said disc is reduced when in said one position, and pressure release means positioned to release the pressure of said brake shoe on said disc.

6. A braking apparatus for differentially braking a shaft in opposite directions of rotation comprising: a shaft rotatable in opposite directions, a disc concentric with and connected to said shaft to rotate with said shaft, an axially movable brake shoe having braking means thereon positioned to engage said disc, a base member, means connected between said base member and said brake shoe for limiting the rotation of said brake shoe between a first position and a second position, a first pressure means extending between said base member and said brake shoe for pressing said brake shoe against said disc, a second pressure means extending between said base member and said brake shoe for applying cumulative force pressing said brake shoe against said disc, said second pressure means including at least three axially movable pins equi-spaced about the axis of said shaft and disc and having rounded ends directed toward said brake shoe, said second pressure means also including spring means having relatively compressed and extended positions, said spring means being arranged for urging said pins against said brake shoe in said compressed position of said spring means and in said first position of said shoe, said brake shoe having a corresponding number of recesses positioned to receive said rounded ends of said pins in said second position of said shoe and in the extended position of the said spring means and to thereby relieve said shoe of the pressure of said pins and spring means, said recesses being defined by outwardly flared surfaces of said brake shoe for engaging said rounded ends of said pins and guiding said pins and spring means between said compressed and extended positions upon movement of said brake shoe between said first and second positions, and pressure release means positioned to release the pressure of said brake shoe on said disc.

7. A braking apparatus as characterized in claim 6 wherein said pressure release means includes a solenoid mounted on said base member and selectively operable to withdraw said brake shoe from said disc against the pressures of both of said pressure means.

References Cited in the file of this patent

UNITED STATES PATENTS

| 1,172,917 | Thomas | Feb. 22, 1916 |
| 2,321,205 | Hodgson | June 8, 1943 |
| 2,401,256 | Lear | May 28, 1946 |
| 2,669,326 | Kniekamp | Feb. 16, 1954 |